United States Patent [19]
Berkcan et al.

[11] Patent Number: 6,111,228
[45] Date of Patent: Aug. 29, 2000

[54] METHOD AND APPARATUS FOR SENSING PROPERTIES OF GLASS-CERAMIC COOKTOP

[75] Inventors: Ertugrul Berkcan, Niskayuna; Jerome Johnson Tiemann, Schenectady; Josef Robert Unternahrer, Niskayuna; Joseph Lucian Smolenski, Slingerlands; Emilie Thorbjorg Saulnier, Rexford, all of N.Y.

[73] Assignee: General Electric Company, Schenectady, N.Y.

[21] Appl. No.: 09/372,469

[22] Filed: Aug. 11, 1999

[51] Int. Cl.⁷ .................................. H05B 3/68; G01J 5/00
[52] U.S. Cl. ..................................... 219/446.1; 250/338.1; 250/339.04
[58] Field of Search ............................. 219/445.1, 446.1, 219/448.11, 460.1, 461.1; 250/338.1, 339.03, 339.04, 339.06, 339.11, 341.8; 374/121, 124, 126, 127, 131, 132; 385/123, 126, 127, 128

[56] References Cited

U.S. PATENT DOCUMENTS

| | | |
|---|---|---|
| 3,137,170 | 6/1964 | Astheimer ........................ 250/339.04 |
| 4,237,368 | 12/1980 | Welch . |
| 4,730,940 | 3/1988 | Herber et al. ........................ 374/127 |
| 4,740,664 | 4/1988 | Payne et al. . |
| 4,932,749 | 6/1990 | Haidle et al. ........................ 385/125 |
| 5,180,226 | 1/1993 | Moslehi ........................... 374/127 |
| 5,227,610 | 7/1993 | Schultheis et al. . |
| 5,231,595 | 7/1993 | Makino et al. .................. 250/339.03 |
| 5,249,142 | 9/1993 | Shirakawa et al. .............. 250/339.04 |
| 5,319,202 | 6/1994 | Pompei . |
| 5,389,764 | 2/1995 | Nishii et al. . |
| 5,488,214 | 1/1996 | Fettig et al. . |
| 5,528,041 | 6/1996 | Pompei . |
| 5,709,473 | 1/1998 | Sultan et al. ........................ 374/131 |

*Primary Examiner*—Sang Paik
*Attorney, Agent, or Firm*—John F. Thompson; Jill M. Breedlove

[57] ABSTRACT

A method and apparatus for sensing properties of glass-ceramic cooktop appliance having at least one burner assembly disposed under a glass-ceramic plate. The sensor assembly includes a waveguide having a first end disposed in the burner assembly and a second end disposed outside of the burner assembly, and at least one detector located adjacent to the waveguide's second end. A radiation collector is located adjacent to the first end of the waveguide so as to direct incident radiation substantially paraxially into the waveguide. The method includes collecting radiation from the glass-ceramic plate, and directing the collected radiation onto a detector located outside of the burner assembly via a waveguide.

29 Claims, 2 Drawing Sheets

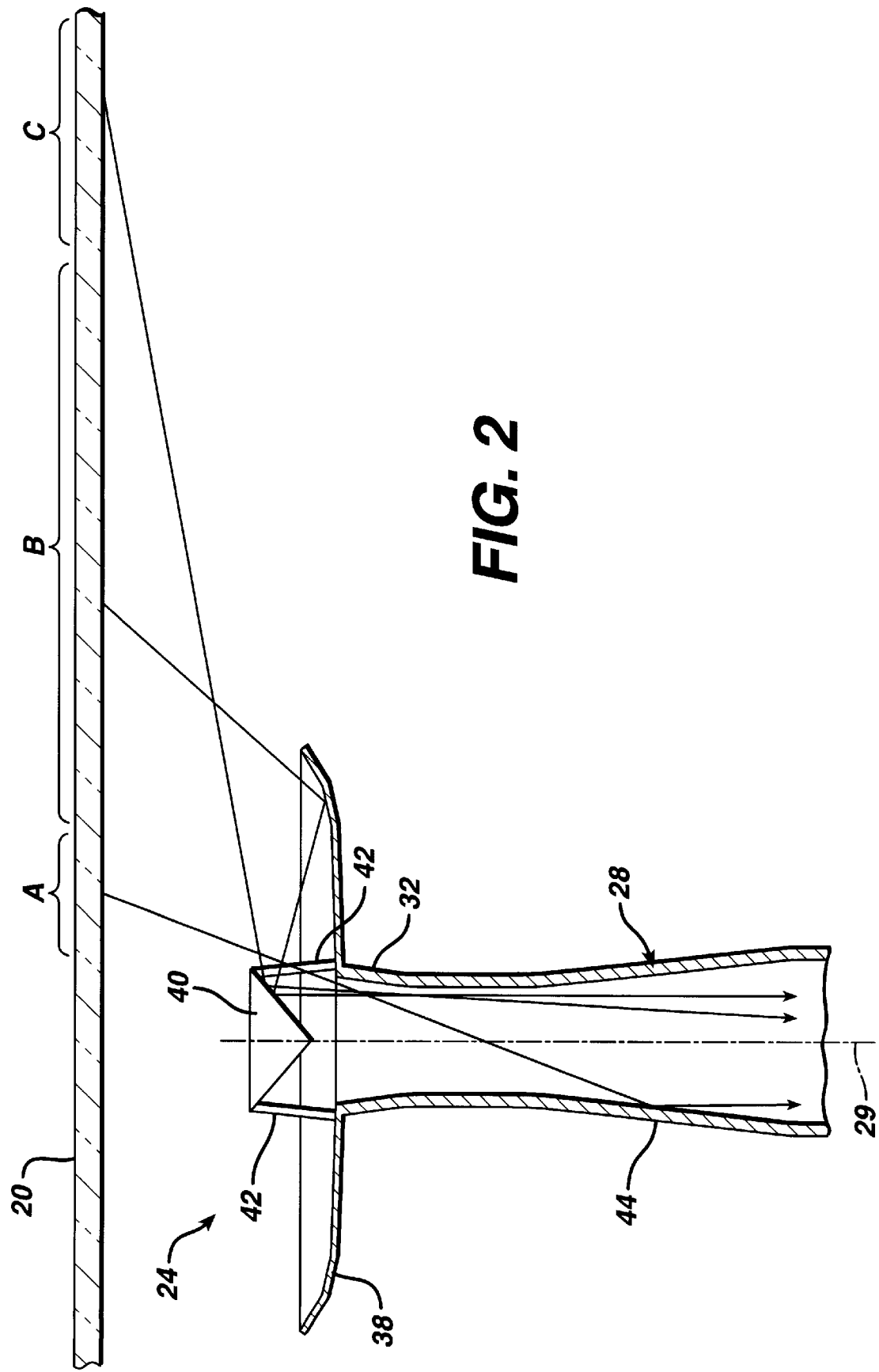

METHOD AND APPARATUS FOR SENSING PROPERTIES OF GLASS-CERAMIC COOKTOP

BACKGROUND OF THE INVENTION

This invention relates generally to glass-ceramic cooktop appliances and more particularly to methods and devices for sensing properties relating to the appliance, such as temperature of the glass-ceramic cooktop surface, properties of cooking utensils placed on the cooktop, and properties of the utensil contents.

The use of glass-ceramic plates as cooktops in cooking appliances is well known. Such glass-ceramic cooktops have a smooth surface that presents a pleasing appearance and is easily cleaned in that the smooth, continuous surface prevents spillovers from falling onto the energy source underneath the cooktop.

In one known type of glass-ceramic cooktop appliance, the glass-ceramic plate is heated by radiation from an energy source, such as an electric coil or a gas burner, disposed beneath the plate. The glass-ceramic plate is sufficiently heated by the energy source to heat utensils upon it primarily by conduction from the heated glass-ceramic plate to the utensil. Another type of glass-ceramic cooktop appliance uses an energy source that radiates substantially in the infrared region in combination with a glass-ceramic plate that is substantially transparent to such radiation. In these appliances, a utensil placed on the cooktop is heated partially by radiation transmitted directly from the energy source to the utensil, rather than by conduction from the glass-ceramic plate. Such radiant glass-ceramic cooktops are more thermally efficient than other glass-ceramic cooktops and have the further advantage of responding more quickly to changes in the power level applied to the energy source. Yet another type of glass-ceramic cooktop appliance inductively heats utensils placed on the cooktop. In this case, the energy source is an RF generator that emits RF energy when activated. The utensil, which contains an appropriate material, absorbs the RF energy and is thus heated.

In each type of glass-ceramic cooktop appliances, provision must be made to avoid overheating the cooktop. For most glass-ceramic materials, the operating temperature should not exceed 600–700° C. for any prolonged period. Under normal operating conditions, the temperature of the glass-ceramic plate will generally remain below this limit. However, conditions can occur which can cause this temperature limit to be exceeded. Commonly occurring examples include operating the appliance with no load, i.e., no utensil, on the cooktop surface, using badly warped utensils that make uneven contact with the cooktop surface, and operating the appliance with a shiny and/or empty utensil.

To protect the glass-ceramic from extreme temperatures, glass-ceramic cooktop appliances ordinarily have some sort of temperature sensing device that removes power from the energy source if high temperatures are detected. In addition to providing thermal protection, such temperature sensors can be used to provide temperature-based control of the cooking surface and to provide a hot surface indication, such as a warning light, after a burner has been turned off.

One common approach to sensing temperature in glass-ceramic cooktop appliances is to place a temperature sensor directly on the underside of the glass-ceramic plate. With this approach, however, the temperature sensor is subject to the high burner temperatures and thus more susceptible to failure. Moreover, direct contact sensors are limited in the area of the glass-ceramic plate that they can monitor and can fail to detect hot spots that may form on the glass-ceramic plate. The heating portion of the glass-ceramic plate (i.e., the portion directly above a burner) tends to get hottest at points not covered by a utensil. Hot spot formation can occur anywhere on the heating portion of the glass-ceramic plate due to poor utensil placement with respect to the burner or by using undersized or warped utensils. And since direct contact sensors do not monitor the entire heating portion of the glass-ceramic plate, the affect of hot spots on the integrated temperature of the entire heating portion may not be accurately measured.

These problems also exist for sensors other than glass-ceramic temperature sensors. This would particularly include sensors that are designed to "look" through the glass-ceramic plate to detect characteristics of a utensil placed on the cooktop, such as the temperature, size or type of the utensil, the presence or absence of the utensil, or the properties, such as boiling state, of the utensil contents.

Accordingly, there is a need for a sensor assembly for glass-ceramic cooktop appliances that can sense cooktop related properties without being subjected to the hot burner environment and that can monitor a relatively large area of the glass-ceramic plate.

SUMMARY OF THE INVENTION

The above-mentioned needs are met by the present invention which provides a method and apparatus for sensing properties of glass-ceramic cooktop appliance having at least one burner assembly disposed under a glass-ceramic plate. The sensor assembly includes a waveguide having a first end disposed in the burner assembly and a second end disposed outside of the burner assembly, and at least one detector located adjacent to the waveguide's second end. A radiation collector is located adjacent to the first end of the waveguide so as to direct incident radiation substantially paraxially into the waveguide. The method includes collecting radiation from the glass-ceramic plate, and directing the collected radiation onto a detector located outside of the burner assembly via a waveguide.

Other objects and advantages of the present invention will become apparent upon reading the following detailed description and the appended claims with reference to the accompanying drawings.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

FIG. 2 is an enlarged, partial view of the sensor assembly of FIG. 1.

DETAILED DESCRIPTION OF THE INVENTION

Figure 1:
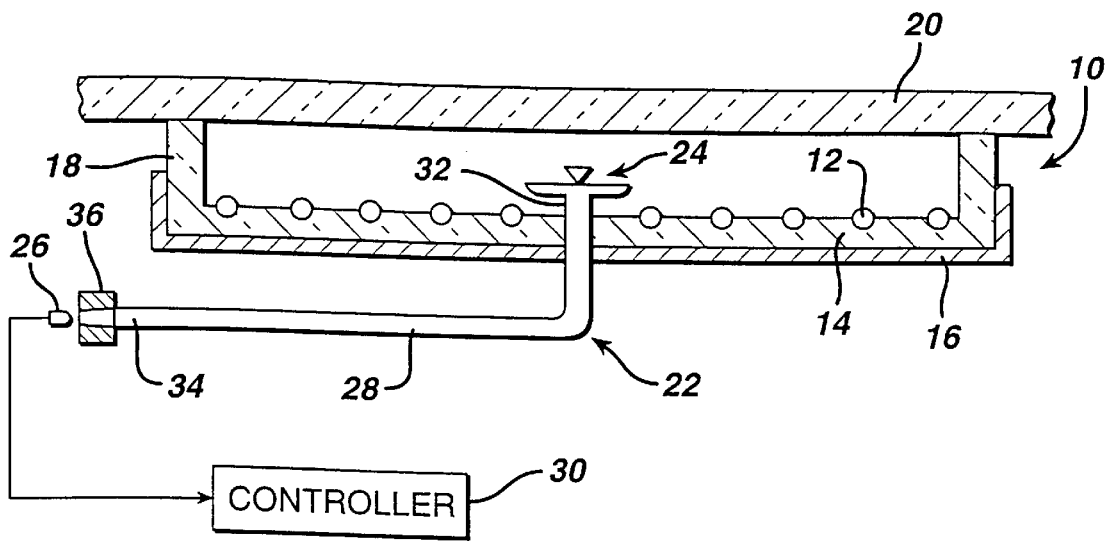
FIG. 1 is a sectional view of a burner assembly having the optical sensor assembly of the present invention.

Referring to the drawings wherein identical reference numerals denote the same elements throughout the various views, FIG. 1 shows a burner assembly 10 of the type suitable for use in a glass-ceramic cooktop appliance, which typically includes a plurality of such burner assemblies. As used herein, the term "cooktop" is intended to refer to both the flat top of a range or stove and a built-in cabinet-top cooking apparatus. Burner assembly 10 includes an open coil electrical resistance element 12, which is designed when fully energized to radiate primarily in the infrared region of the electromagnetic energy spectrum. It should be noted that another type of energy source, such as a gas burner or an RF generator, could be used in place of element 12. Element 12 is arranged in an effective heating pattern such as a concentric coil and is secured to the base of an insulating liner 14 which is supported in a sheet metal support pan 16. Insulating liner 14 includes an annular, upwardly extending portion 18 which serves as an insulating spacer between element 12 and a glass-ceramic plate 20 that provides the cooktop surface. Support pan 16 is, in one embodiment, spring loaded upwardly, forcing annular portion 18 into abutting engagement with the underside of glass-ceramic plate 20, by conventional support means (not shown).

An optical sensor assembly 22 is provided to detect one or more characteristics relating to the cooking appliance (referred to herein as "cooktop related properties"), such as the temperature of glass-ceramic plate 20, the presence or absence of a utensil on the cooktop, the temperature, size or type of utensil on the cooktop, or the properties or state of the utensil contents. Sensor assembly 22 includes a radiation collector 24 disposed in the interior of burner assembly 10 underneath glass-ceramic plate 20. This location provides radiation collector 24 with a field of view of the desired sensing location (i.e., the portion of glass-ceramic plate 20 directly over burner assembly 10). Radiation gathered by radiation collector 24 is delivered to at least one optical detector 26 (additional detectors may be employed) located at a relatively cool place outside of burner assembly 10 via a light pipe or waveguide 28. Detector 26 can be any suitable type of detector such as bolometer or thermopile. Waveguide 28 allows detector 26 to be located where the thermal environment is more favorable. The use of waveguides also permits the co-location and sharing of detectors among several burner assemblies. The output of detector 26 is fed to a conventional controller 30, which is a common element used in most glass-ceramic cooktop appliances.

Waveguide 28 is preferably a metal tube having a highly reflective internal surface. Preferably, waveguide 28 is provided with an internal coating that is an excellent infrared reflector and has very low emissivity. Gold is one preferred internal coating material because of its high reflectivity and low emissivity. To prevent the tube material, which is preferably a metal such as copper, from bleeding into the internal coating, a barrier layer can be deposited between the metal tube and the internal coating. The barrier layer can comprise any suitable material, such as nickel or nichrome.

Waveguide 28 extends through the bottom of insulating liner 14 and support pan 16 so as to have a first or entry end 32 disposed in the interior of burner assembly 10 adjacent to radiation collector 24 and a second or exit end 34 located outside of burner assembly 10 adjacent to detector 26. Preferably, waveguide 28 extends through the bottom of insulating liner 14 and support pan 16 at their respective center points so as not to interfere with element 12.

As shown in FIG. 1, waveguide 28 is gently bent at a point intermediate its two ends so as to reflect radiation through a 90 degree turn. Thus, detector 26 is located not only below burner assembly 10 but also beyond its outer circumference. This configuration could alternatively be accomplished by providing waveguide 28 with a planar region formed at a 45 degree angle. Furthermore, it should be noted that waveguide 28 could also be straight, without any bend, so that detector 26 would be located directly below the point at which waveguide 28 extends through the bottom of insulating liner 14 and support pan 16.

As will be described more fully below, the radiation passing through waveguide 28 is substantially paraxial, i.e., parallel to the waveguide's central axis. However, since detector 26 responds to arriving radiation at all angles, it is desirable that detector 26 sees only the radiation of interest over a large fraction of its field of view. For this reason, a light concentrator 36 is located between the exit end 34 of waveguide 28 and detector 26. Light concentrator 36 converts the substantially paraxial radiation exiting waveguide 28 into a light cone that is as close as possible to 180 degrees by using any suitable means such as a conventional parabolic light concentrator (i.e., a paraboloid of revolution) or a compound parabolic light concentrator. To facilitate this function, in the case of a compound parabolic concentrator, the diameter of waveguide 28 at its exit end 34 is larger than the width of detector 26, and detector 26 is located at the focal point of the paraboloid.

Turning to FIG. 2, radiation collector 24 is shown in greater detail. Radiation collector 24 includes primary and secondary reflectors 38 and 40. Primary reflector 38 is a shallow bowl-shaped structure attached to first end 32 of waveguide 28 so as to surround the entrance of waveguide 28. Primary reflector 38 thus defines a concave reflective surface that faces the underside of glass-ceramic plate 20. Secondary reflector 40 is a conical member suspended directly over entry end 32 of waveguide 28 by a plurality of supports 42 extending from primary reflector 38. The point of the conical secondary reflector 40 is aligned with the waveguide's central axis 29. Secondary reflector 40 defines a conical reflective surface that faces the concave reflective surface of primary reflector 38. Like the internal surface of waveguide 28, the reflective surfaces of both reflectors 38 and 40 are preferably coated with a material, such as gold, that is an excellent infrared reflector and has very low emissivity.

With this arrangement of reflectors, radiation collector 24 collects radiation from the entire region of glass-ceramic plate 20 that is heated by heating element 12 (referred to herein as a "heating portion" of glass-ceramic plate 20). The collected radiation is delivered to waveguide 28 in three ways. Some of the radiation emanating from (or through) glass-ceramic plate 20 that strikes primary reflector 38 will be reflected onto secondary reflector 40 and then re-reflected into waveguide 28. Other radiation will strike secondary reflector 40 initially and be reflected into waveguide 28, and still other radiation will enter waveguide 28 directly.

Referring again to FIG. 2, each of these delivery modes is illustrated. Some of the radiation from an annular region A of glass-ceramic plate 20 that is near the center of the heating portion enters waveguide 28 directly. Since this radiation enters at steeper angles than radiation that is reflected by radiation collector 24, waveguide 28 is provided with a diverging throat or "inverse concentrator" 44 near its entry end 32 that reflects the radiation in a more paraxial direction. Most of the radiation from a region B of the heating portion, outside of region A, reflects initially from primary reflector 38 and then from secondary reflector 40 into waveguide 28. Radiation from a region C at the outer circumference of the heating portion, which arrives at extremely steep angles with respect to central axis 29, reflects initially from secondary reflector 36 into waveguide 28.

Thus, radiation collector 24 collects radiation from a nearly 180 degree field of view and directs it into waveguide 28 with about a 20 degree acceptance angle; that is, radiation enters waveguide 28 at angles no greater than 20 degrees with respect to central axis 29. The advantage of this is that radiation entering at steeper angles would reflect many times as it passes through waveguide 28. And although waveguide 28 is provided with a highly reflective internal surface, a large number of reflections would result in appreciable losses, leading to detection inaccuracies. Because radiation collector 24 delivers collected radiation substantially paraxially, the radiation passes through waveguide 28 with relatively few reflections.

Figure 3:
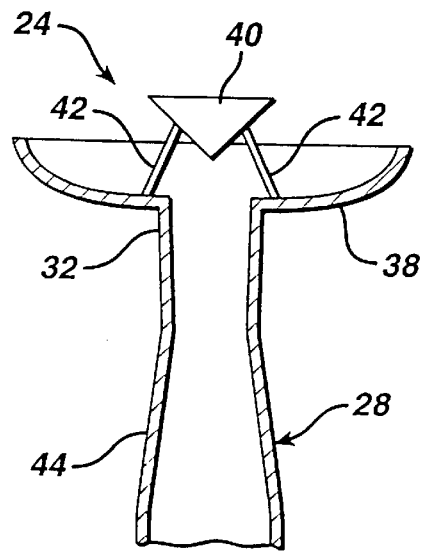
FIG. 3 is an enlarged, partial view of a second embodiment of the optical sensor assembly.

As shown in FIG. 2, primary reflector 38 is made of a plurality of frustoconical segments with different pitches arranged to define its bowl shape. Alternatively, primary reflector 38 can comprise a continuous curved bowl shape as shown in FIG. 3. While the continuous curve shape provides better sensitivity, the segmented configuration of FIG. 2 is typically easier and less expensive to manufacture.

In operation, radiation collector 24 collects radiation from the entire region of glass-ceramic plate 20 that is heated by burner assembly 10. Radiation collector 24 delivers the collected radiation substantially paraxially to waveguide 28. The collected radiation passes through waveguide 28 and is directed onto detector 26 outside of burner assembly 10. The detector 26 produces a signal representative of a cooktop related property, such as the integrated temperature of the entire heating portion, that is fed to controller 30. As mentioned above, light concentrator 36 converts the radiation exiting waveguide 28 into a light cone that is as close as possible to 180 degrees.

The foregoing has described a remote sensor assembly for a burner in a glass-ceramic cooktop appliance having a wide field of view. While specific embodiments of the present invention have been described, it will be apparent to those skilled in the art that various modifications thereto can be made without departing from the spirit and scope of the invention as defined in the appended claims.

What is claimed is:

1. A sensor assembly for a glass-ceramic cooktop appliance having at least one burner assembly disposed under a glass-ceramic plate, said sensor assembly comprising:
    a waveguide having first and second ends, said first end being disposed in said burner assembly and said second end being disposed outside of said burner assembly;
    at least one detector located adjacent to said second end of said waveguide; and
    a radiation collector located adjacent to said first end of said waveguide for directing incident radiation into said waveguide, said incident radiation being collected from about a 180 degree field of view measured from a central axis of said waveguide.

2. The sensor assembly of claim 1 wherein said radiation collector includes a primary reflector disposed around said first end of said waveguide and a secondary reflector disposed above said first end of said waveguide.

3. The sensor assembly of claim 2 wherein said primary reflector defines a concave reflective surface facing said glass-ceramic plate and said secondary reflector defines a conical reflective surface facing said concave reflective surface.

4. The sensor assembly of claim 3 wherein both said concave reflective surface and said conical reflective surface are coated with a material that has a high reflectivity and low emissivity.

5. The sensor assembly of claim 3 wherein said primary reflector is made of a plurality of frustoconical segments defining a bowl shape.

6. The sensor assembly of claim 3 wherein said primary reflector defines a continuous curved bowl shape.

7. The sensor assembly of claim 1 wherein said waveguide is provided with an internal coating that has a high reflectivity and low emissivity.

8. The sensor assembly of claim 1 wherein said waveguide is provided with a diverging throat near said first end.

9. The sensor assembly of claim 1 wherein said waveguide is bent at a point intermediate said first and second ends.

10. The sensor assembly of claim 1 further comprising a light concentrator disposed between said second end of said waveguide and said detector.

11. The sensor assembly of claim 10 wherein said light concentrator is selected from the group comprising a paraboloid of revolution and a compound parabolic concentrator.

12. A sensor assembly for a glass-ceramic cooktop appliance having at least one burner assembly disposed under a glass-ceramic plate, said sensor assembly comprising:
    a waveguide having first and second ends, said first end being disposed in said burner assembly and said second end being disposed outside of said burner assembly;
    at least one detector located adjacent to said second end of said waveguide; and
    a radiation collector located adjacent to said first end of said waveguide for directing radiation from said glass-ceramic plate into said waveguide, said radiation collector directing said radiation substantially parallel to said central axis of said waveguide wherein said radiation is collected from substantially an entire region of said glass-ceramic plate being heated by said burner assembly.

13. The sensor assembly of claim 12 wherein said means for collecting radiation includes a primary reflector disposed around said first end of said waveguide and a secondary reflector disposed above said first end of said waveguide.

14. The sensor assembly of claim 13 wherein said primary reflector defines a concave reflective surface facing said glass-ceramic plate and said secondary reflector defines a conical reflective surface facing said concave reflective surface.

15. The sensor assembly of claim 14 wherein both said concave reflective surface and said conical reflective surface are coated with a material that has a high reflectivity and low emissivity.

16. The sensor assembly of claim 14 wherein said primary reflector is made of a plurality of frustoconical segments defining a bowl shape.

17. The sensor assembly of claim 14 wherein said primary reflector defines a continuous curved bowl shape.

18. The sensor assembly of claim 12 wherein said waveguide is provided with an internal coating that has a high reflectivity and low emissivity.

19. The sensor assembly of claim 12 wherein said waveguide is provided with a diverging throat near said first end.

20. The sensor assembly of claim 12 wherein said waveguide is bent at a point intermediate said first and second ends.

21. The sensor assembly of claim 12 further comprising a light concentrator disposed between said second end of said waveguide and said detector.

22. The sensor assembly of claim 21 wherein said light concentrator is selected from the group comprising a paraboloid of revolution and a compound parabolic concentrator.

23. The sensor assembly of claim 12 wherein substantially said entire region being heated by said burner assembly comprises about a 180 degree field of view measured from a central axis of said waveguide.

24. A method for sensing cooktop related properties in a glass-ceramic cooktop appliance having at least one burner assembly disposed under a glass-ceramic plate, said method comprising the steps of:

collecting radiation from substantially an entire region of said glass-ceramic plate being heated by said burner assembly; and providing the collected radiation to a detector located outside of said burner assembly.

25. The method of claim 24 further comprising the step of directing the collected radiation through a waveguide.

26. The method of claim 25 wherein the collected radiation is directed substantially parallel to a central axis of said waveguide.

27. The method of claim 26 further comprising the step of converting the delivered radiation exiting said waveguide into a light cone that is about 180 degrees.

28. The method of claim 25 wherein substantially said entire region being heated by said burner assembly comprises about a 180 degree field of view measured from a central axis of said waveguide.

29. A method for sensing cooktop related properties in a glass-ceramic cooktop appliance having at least one burner assembly disposed under a glass-ceramic plate, said method comprising the steps of:

collecting radiation from substantially an entire region of said glass-ceramic plate being heated by said burner assembly;

directing the collected radiation through a waveguide wherein the collected radiation is directed substantially parallel to a central axis of said waveguide; and providing the directed radiation to a detector located outside of said burner assembly.

* * * * *